United States Patent
Kumar et al.

(10) Patent No.: US 10,922,216 B1
(45) Date of Patent: Feb. 16, 2021

(54) INTELLIGENT AUTOMATION TEST WORKFLOW

(71) Applicant: Oracle International Corporation, Redwood Shores, CA (US)

(72) Inventors: Vivek Kumar, Redwood City, CA (US); Catherine You Francis, Berkeley, CA (US); Meeten Bhavsar, Emerald Hills, CA (US); Prabhakara Reddy Munnangi, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/601,937

(22) Filed: Oct. 15, 2019

(51) Int. Cl.
*G06F 9/44* (2018.01)
*G06F 11/36* (2006.01)

(52) U.S. Cl.
CPC ........ *G06F 11/3688* (2013.01); *G06F 11/368* (2013.01); *G06F 11/3684* (2013.01); *G06F 11/3692* (2013.01)

(58) Field of Classification Search
CPC ............... G06F 11/3688; G06F 11/368; G06F 11/3684; G06F 11/3692
USPC ......................................................... 717/124
See application file for complete search history.

(56) References Cited

U.S. PATENT DOCUMENTS

| | | | |
|---|---|---|---|
| 6,345,387 B1* | 2/2002 | Morrison | G06F 9/45508 714/E11.211 |
| 2005/0166094 A1* | 7/2005 | Blackwell | G06F 11/3688 714/38.14 |
| 2006/0242466 A1* | 10/2006 | Tillmann | G06F 11/3684 714/38.1 |
| 2007/0226691 A1* | 9/2007 | Happell | G06F 11/368 717/124 |
| 2011/0161936 A1* | 6/2011 | Huang | G06F 11/3688 717/130 |
| 2012/0042302 A1* | 2/2012 | Sikandar | G06F 11/3688 717/125 |
| 2013/0174178 A1* | 7/2013 | Chakraborty | G06F 11/3672 718/105 |

(Continued)

OTHER PUBLICATIONS

Title Mapping UML to labeled transition systems for test-case generationauthor: W Krenn, published on 2009.*

(Continued)

*Primary Examiner* — Chameli Das
(74) *Attorney, Agent, or Firm* — Invoke

(57) ABSTRACT

Techniques are included for intelligently testing a software product using a limited number of test cases that are configured to test portions of the software product that have changed since a prior testing. To determine which test cases are best used for testing the implemented changes, a test case-to-programmatic flow mapping may be generated that relates each test case available for testing the software product with each programmatic flow that is tested by the test case. In addition, a programmatic flow-to-artifact mapping may be created that relates each programmatic flow discovered in the software product to each artifact that is accessed, created, changed, or dependent on the programmatic flow. Using these mappings, specific test cases may be determined for testing only those portions of the software product that have changed since the prior testing.

20 Claims, 7 Drawing Sheets

(56) References Cited

U.S. PATENT DOCUMENTS

| | | | |
|---|---|---|---|
| 2015/0007146 A1* | 1/2015 | Li | G06F 11/3684 |
| | | | 717/130 |
| 2015/0067648 A1* | 3/2015 | Sivanesan | G06F 11/3684 |
| | | | 717/124 |
| 2015/0160929 A1* | 6/2015 | Bently | G06F 8/30 |
| | | | 717/106 |
| 2015/0205709 A1* | 7/2015 | Michelsen | G06F 11/3419 |
| | | | 714/38.1 |
| 2015/0293837 A1* | 10/2015 | Rajamanickam | G06F 11/3676 |
| | | | 717/130 |

OTHER PUBLICATIONS

Title: Case study of feature location using dependence graph; author: K Chen et al, published on 2000; source: IEEE.*

* cited by examiner

INTELLIGENT AUTOMATION TEST WORKFLOW

TECHNICAL FIELD

The present disclosure relates to testing software products. In particular, the present disclosure relates to determining a precise test set for intelligent code testing of software products.

BACKGROUND

For large scale enterprises with thousands of products and many tens of thousands of software developers, possibly spread all across the country and globe, it is challenging to test software products. These products are created by the developers and may be modified and updated throughout the lifecycle of the products. Therefore, the products are continuously changing. Every single day, thousands of code changes may occur to any single product due to work by the various developers. After implementing these code changes, the functionality of the product should be tested for quality control. However, because test cases have been accumulated over a long period of time during development of the product, a very large test set exists for testing the product. It takes a long time to execute this conventional test set, which slows the product development cycle considerably.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
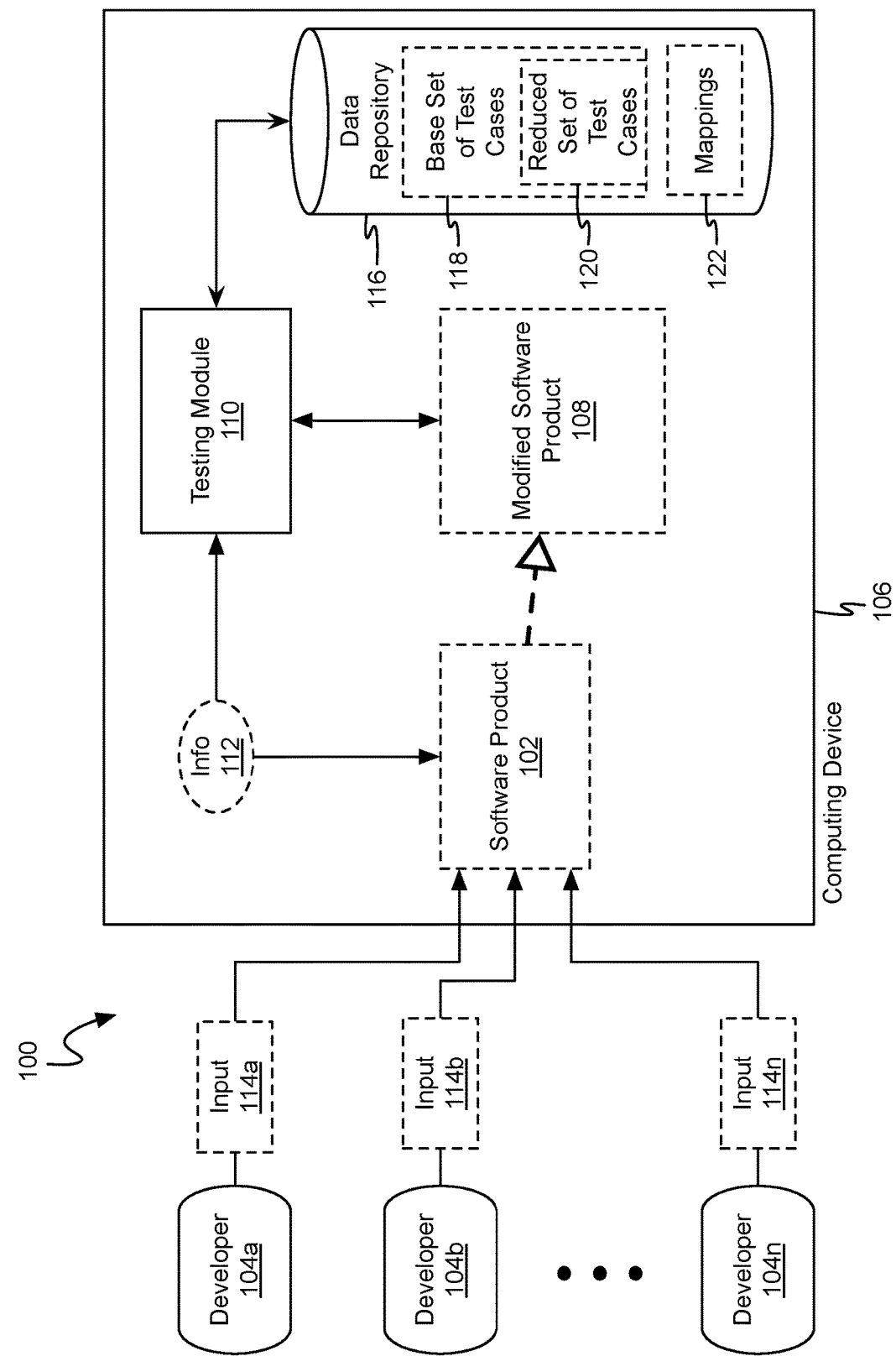
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TEST SELECTION SYSTEM
3. GENERATING METADATA MAPPING TESTS, PROGRAMMATIC FLOWS, AND ARTIFACTS
4. DETERMINING A REDUCED SET OF TEST CASES
5. EXAMPLE EMBODIMENTS
6. COMPUTER NETWORKS AND CLOUD NETWORKS
7. MISCELLANEOUS; EXTENSIONS
8. HARDWARE OVERVIEW

1. General Overview

One or more embodiments select tests for testing a software product based on metadata corresponding to each of the tests. Specifically, the system generates metadata for each test of a base set of tests that are executed on an initial version of the software product. The metadata, for a test, identifies a programmatic flow (for example, a User Interface flow) corresponding to that test. The programmatic flow includes the components/features involved in the execution of the test. The system further generates metadata that identifies artifacts (for example, sections of code, objects etc.) of the software product that may be accessed by the programming flow. Thus, the metadata generated by the system captures a relationship from (a) a test to (b) programmatic flow(s) to (c) artifact(s) of the software product.

When the initial version of the software product is modified via code changes to generate a new version of the software product, the new version of the software product has to be tested. A subset (also referred to herein as a "reduced set") of test cases are selected from the base set of test cases to test the new version of the software product. The reduced set of test cases are selected based on the particular artifacts of the software product that have been modified. Using the metadata, the system maps the subset of artifacts, that have been modified, to a target set of one or more programmatic flows that access at least one of the subset of artifacts. The system then further maps the resulting target set of programmatic flows to corresponding tests from the base set of sets. The system may select a single test or multiple tests, from the base set of tests, corresponding to each programmatic flow in the target set of programmatic flows. The selected set of tests are then executed for testing the new version of the software product. The selected set of tests may be a small subset of the base set of tests. Accordingly, testing the new version of the software product using the selected set of tests may require much fewer resources and/or a much smaller amount of time for execution than the base set of tests.

One or more embodiments described in this Specification and/or recited in the claims may not be included in this General Overview section.

2. Test Selection System

Due to code under development constantly changing, it is difficult to devise and execute a reliable testing strategy while keeping a shorter execution time. Typically, execution times for test sets will be determined based on a size of the test set. Therefore, in order to reduce the execution time for a test set, it is useful to select a smallest viable test set that is sufficient to adequately test the code. When a test set is reduced in size to this scale, it is difficult to determine which tests should be included and which can be excluded for efficiency sake without forfeiting the purpose of the tests themselves, e.g., to ensure that the code works properly.

Accordingly, large enterprises may choose to run an entire test set, which may take days or longer to execute, or randomly pick a smaller subset of test cases to include in the test set in order to cut the execution time while sacrificing performance.

FIG. 1 illustrates a system 100 in accordance with one or more embodiments. As illustrated in FIG. 1, system 100 includes a computing device 106 configured to host and/or manage a software product 102 under development and/or testing. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, software product 102 corresponds to a set of electronic program instructions and/or data that one or more computer processors read in order to perform one or more tasks and/or operations. The software product 102 may be include systems software and/or application software.

Systems software correspond to programs dedicated to managing a computer system. Some example computer management functionality that may be provided by systems software includes, but is not limited to, an operating system, file management utility, disk operating system, hardware component management, resource management, etc.

Application software correspond to productivity programs and/or end-user programs that enable a user to complete tasks. Some example tasks that application software may be configured to perform include, but are not limited to, creating and managing documents, creating and managing spreadsheets, creating and managing databases, creating and managing graphics, performing research, sending and receiving electronic communications such as emails, playing games, etc.

Any software product 102 may be tested and/or managed by the computing device 106, such as a mobile computing platform application, a server-level application, an end-user application for distribution to a plurality of remote computing device, etc. The software product 102 includes a plurality of code artifacts. A code artifact, or artifact as used herein, may refer to any tangible by-products produced during development of the software product 102. Many different types of artifacts may exist within the software product 102, including but not limited to, visual representation files, executables, code segments, objects, etc. Moreover, an artifact may describe an application or a complex data object that is created by an end user, typically without needing to know a general programming language. For example, artifacts may describe automated behavior or control sequences, such as database requests, user interface actions, grammar rules, user-generated content, etc.

Computing device 106 may be configured to communicate with a data repository stored to one or more computer readable storage media configured to store the software product 102 during development and/or testing. The system 100 is in communication with a plurality of developer devices 104a, 104b, ..., 104n, each of which may provide input 114a, 114b, ..., 114n, respectively, from one or more developers for collaboratively creating, developing, modifying, changing, refining, and/or testing the software product 102.

In an embodiment, computing device 106 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device. In an alternate embodiment, computing device 106 may be partially or completely implemented as a software component operating within a hardware environment.

In various examples, computing device 106 may be a desktop computer, laptop computer, tablet computer, smartphone, server, client device, or some other hardware device capable of communicating with the various developer devices 104a, 104b, ..., 104n.

The input 114a, 114b, ..., 114n from the various developer devices 104a, 104b, 104n may change one or more aspects of the software product 102, resulting in a modified software product 108. The modified software product 108 results from the initial software product 102 being changed to include, exclude, and/or modify certain code artifacts thereof as a result of the input 114a, 114b, ..., 114n from the various developer devices 104a, 104b, 104n. Thus, the modified software product 108 includes some modified artifacts and possibly some unmodified artifacts. A modified code artifact corresponds to an artifact from the software product 102 that has been altered, due to input 114a, 114b, ..., 114n, to become different in at least one way, such as by adding code, removing code, changing references to other artifacts or programs, etc. An unmodified artifact corresponds to an artifact from the software product 102 that has not been altered due to the input 114a, 114b, ..., 114n.

This modified software product 108, due to the changes, may fail to function properly and/or be unstable under certain operating conditions. If these issues exist, the modified software product 108 would be unsuitable for use and/or distribution to end users. Therefore, the modified software product 108 may be tested for stability, viability, performance, bugs, and/or hang-ups. The testing may be performed by a testing module 110, which is tasked with testing various software products, such as the software product 102 and the modified software product 108.

Testing module 110 is configured to determine and/or obtain an artifact modification log 112 from the software product 102 in order to more efficiently test the modified software product 108. The artifact modification log 112 includes indication of each artifact that is changed from a previous version of the software product 102. The artifact modification log 112 may also include, in one or more embodiments, indication of when (e.g., a time/date stamp) a change was made to each modified artifact, indication of unmodified artifacts that are unchanged, and/or indication of where the change(s) originated from.

An example artifact modification log 112 may include indication of changes made to certain artifacts of the software product 102 since prior testing was performed, test cases previously executed on the software product 102, results and/or analysis of the previous test cases executed on the software product 102, etc. In one embodiment, an artifact is indicated in the artifact modification log 112 in response to the artifact being changed since a previous testing of the software product 102. Further, if an artifact is already indicated in the artifact modification log 112 due to a previous change, the entry is modified based on any subsequent changes to the artifact, rather than creating a duplicate entry for the same artifact.

Rather than allocating a certain amount of time to perform software product testing, and selecting a random set of test cases that will resolve within the predetermined amount of time, the testing module 110 is configured to provide an informed set of test cases that are targeted toward robustly testing the modified software product 108 without running arbitrary test cases that will not enlighten the current condition of the modified software product 108. Moreover, the informed set of test cases may include fewer test cases than the scenario where random test cases are selected, and may also be able to complete more expediently than the random test cases. The informed set of test cases may also generate greater confidence in the testing process, and ultimately the resulting modified software product 108.

The components illustrated in FIG. 1 may be local to or remote from each other. The components illustrated in FIG. 1 may be implemented in software and/or hardware. Each component may be distributed over multiple applications, devices, and/or machines. Multiple components may be combined into one application, device, and/or machine. Operations described with respect to one component may instead be performed by another component or shared across multiple components.

Additional embodiments and/or examples relating to computer networks which may be used to communicate between various components of FIG. 1 are described below in Section 6. Computer Networks and Cloud Networks.

In one or more embodiments, a data repository 116 may be included in the system 100 for storing a base set of test cases 118, various mappings 122 (including a test case-to-programmatic flow mapping and a programmatic flow-to-artifact mapping), the software product 102, the modified software product 108, and/or the artifact modification log 112. The data repository may include any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. Further, the data repository may be implemented or may execute on the same computing system as computing device 106. Alternatively or additionally, the data repository may be implemented or executed on a computing system separate from computing device 106. The data repository may be communicatively coupled to computing device 106 via a direct connection, via a wireless connection, via a network, or some other connection that would be apparent to one of ordinary skill in the art.

The base set of test cases 118, in an embodiment, are those test cases that have been created or generated for testing the software product 102 for quality and functionality. The base set of test cases 118 may be generated specifically for testing the software product 102 at one time, or may be accumulated over a period of time during which the test cases are created for the software product and previous versions thereof. The reduced set of test cases 120 are selected from the base set of test cases 118. In an approach, the reduced set of test cases 120 are those particular test cases that address particular changes to the software product 102 that have occurred since prior testing of the software product 102 took place. In one approach, the changes that are addressed by the reduced set of test cases 120 may have caused generation of the modified software product 108 from the original software product 102.

The test case-to-programmatic flow mapping may be generated based on execution of the base set of test cases 118. In an approach, the test case-to-programmatic flow mapping may be generated by associating each test case from the base set of test cases 118 with one or more programmatic flows that are tested by the particular test case, with the association being based on analysis of which portions of the software product 102 are accessed by the particular test case. Examples of test case-to-programmatic flow mappings are described in more detail later.

The programmatic flow-to-artifact mapping may be generated by associating all of the modified artifacts from the base set of test cases 118 and any dependencies that these modified artifacts have with other artifacts in the modified software product 108 with a corresponding programmatic flow that uses, references, or relates to the modified artifact. The programmatic flow-to-artifact mapping indicates which artifacts are related to each of the various programmatic flows in the modified software product 108. Examples of programmatic flow-to-artifact mappings are described in more detail later.

In one or more embodiments, an interface may be implemented in hardware and/or software to facilitate communications between computing device 106 and the various developer devices 104a, 104b, . . . , 104n. Interface may render user interface elements and receive input via the user interface elements. Examples of interfaces include a graphical user interface (GUI), a command line interface (CLI), a haptic interface, a voice command interface, etc. Examples of user interface elements include checkboxes, radio buttons, dropdown lists, list boxes, buttons, toggles, text fields, date and time selectors, command lines, sliders, pages, and forms.

In an embodiment, different components of an interface may be specified in different languages. The behavior of each user interface element may be specified in a dynamic programming language, such as JavaScript. The content of user interface elements may be specified in a markup language, such as hypertext markup language (HTML), eXtensible Markup Language (XML), XML User Interface Language (XUL), etc. Moreover, a layout of user interface elements may be specified in a style sheet language, such as Cascading Style Sheets (CSS). Alternatively, an interface may be specified in one or more other languages, such as Java, C, C++, etc.

Figure 2:
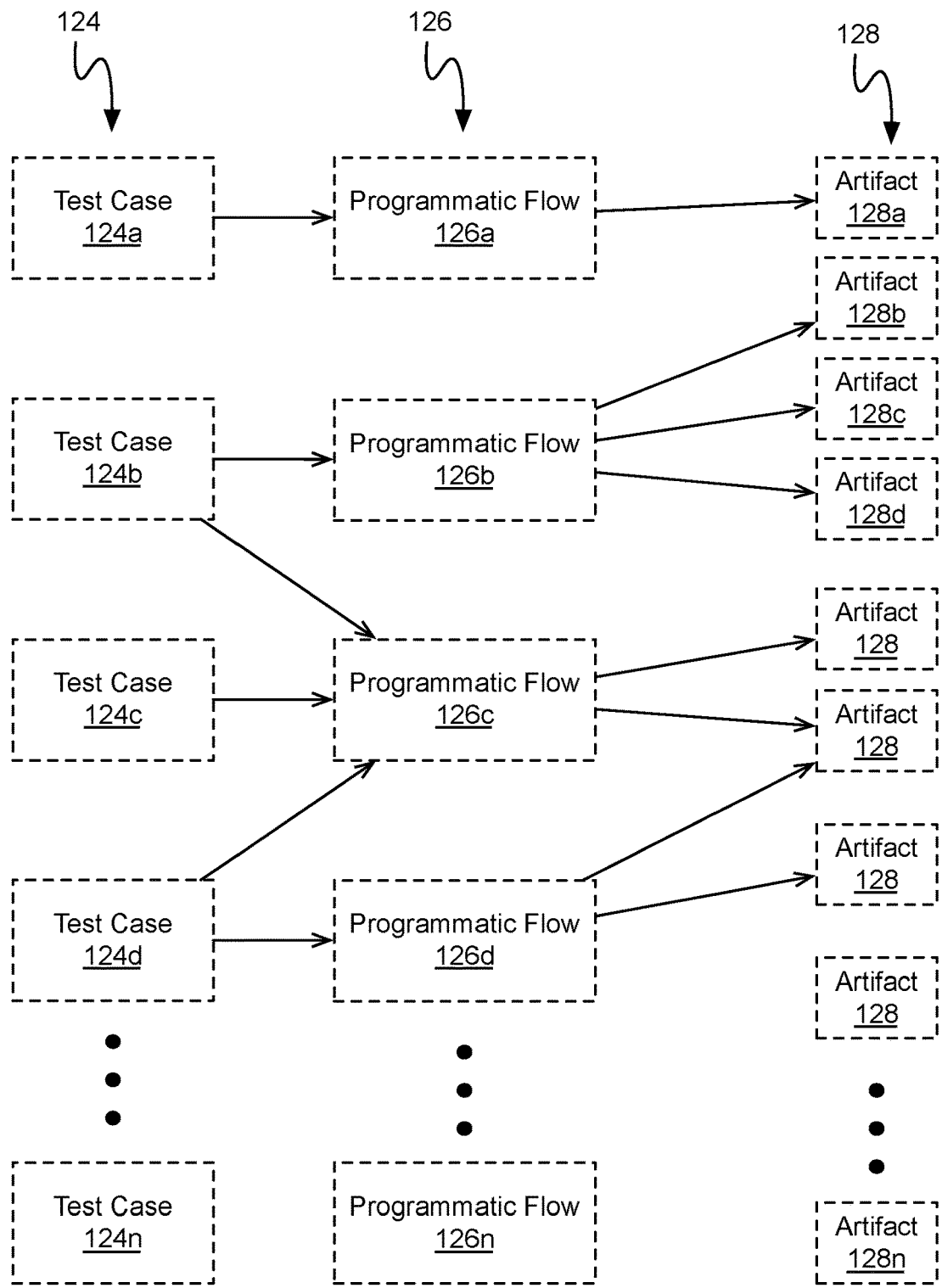
FIG. 2 shows relationships between various test cases, programmatic flows of a software product, and artifacts within the software product.

FIG. 2 shows relationships between various test cases 124, programmatic flows 126 of a software product (e.g., software product 102 and/or modified software product 108), and artifacts 128 within the software product. In an embodiment, a particular test case (e.g., test case 124a) may reference and/or test one programmatic flow (e.g., programmatic flow 126a) on a 1:1 basis. In an embodiment, a particular test case (e.g., test case 124b) may reference and/or test multiple programmatic flows (e.g., programmatic flow 126b and programmatic flow 126c) on a 1:N basis.

According to one embodiment, a particular programmatic flow (e.g., programmatic flow 126a) may reference, access, use, and/or relate to one artifact (e.g., artifact 128a) on a 1:1 basis. In an embodiment, a particular programmatic flow (e.g., programmatic flow 126b) may reference, access, use, and/or relate to multiple artifacts (e.g., artifact 128b, artifact 128c, and artifact 128d) on a 1:N basis.

In one or more embodiments, due to the 1:1 basis and 1:N basis of the relationships between test cases, programmatic flows, and artifacts: (a) a particular test case (e.g., test case 124a) may be mapped to one programmatic flow (e.g., programmatic flow 126a) which maps to one artifact (e.g., artifact 128a) on a 1:1:1 basis, (b) a particular test case may be mapped to one programmatic flow which maps to multiple artifacts on a 1:1:N basis, (c) a particular test case may be mapped to a plurality of programmatic flows which all map to one artifact on a 1:N:1 basis, (d) a particular test case may be mapped to multiple programmatic flows which map to multiple artifacts on a 1:N:N basis, (e) multiple test cases may be mapped to one programmatic flow which all map to one artifact on a N:1:1 basis, (f) multiple test cases may be mapped to multiple programmatic flows which all map to one artifact on a N:N:1 basis, (g) multiple test cases may be mapped to one programmatic flow which is mapped to multiple artifacts on an N:1:N basis, or (h) multiple test cases may be mapped to multiple programmatic flows which are mapped to multiple artifacts on an N:N:N basis.

Figure 3A:
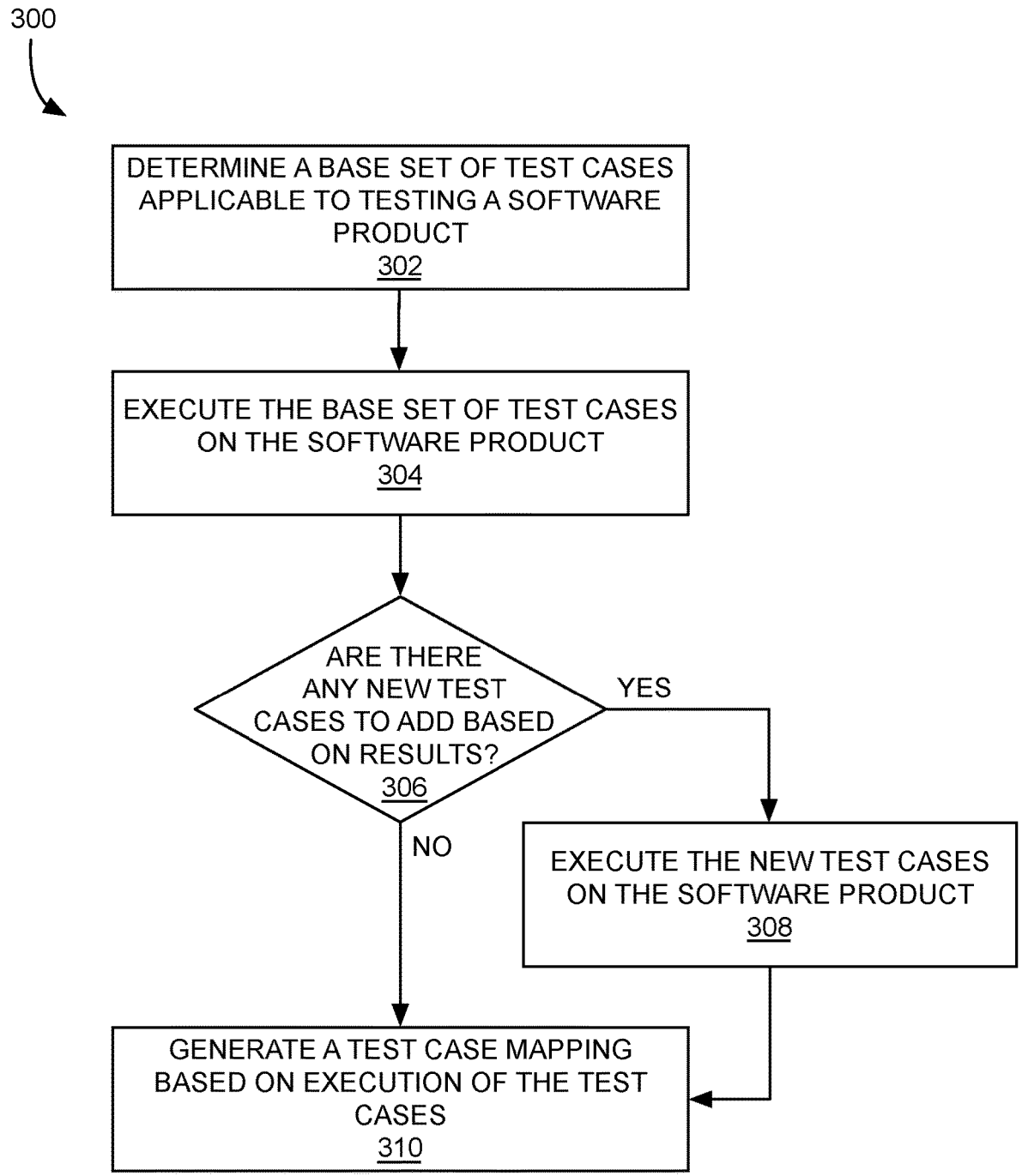
FIG. 3A illustrates an example method for generating metadata that maps test cases to programmatic flows in accordance with one or more embodiments.

3. Generating Metadata Mapping Test Cases, Programmatic Flows, and Artifacts FIG. 3A illustrates an example method 300 for generating metadata that maps test cases to programmatic flows in accordance with one or more embodiments. One or more operations illustrated in FIG. 3A may be modified, rearranged, or omitted all together. Accordingly, the particular sequence of operations illustrated in FIG. 3A should not be construed as limiting the scope of one or more embodiments.

In an embodiment, the system determines a base set of test cases that are applicable to testing a particular software product (Operation 302). The set may include any number of test cases, ranging anywhere from a few test cases, to hundreds of test cases, thousands of test cases, up to 10,000 test cases, or more, in various approaches. The number of test cases included in the set of test cases is dictated by the size of the software product in addition to how many different functions, computations, aspects, and flows that the developers desire to test in the software product.

As developers build the software product, possibly over a period of time that lasts for days, weeks, months, or even years, the software product may undergo many iterations, with code being added, removed, and modified. All of these changes may result in unexpected and undesirable behavior from the software product. Therefore, as the software product is developed, test cases may be created, e.g., by the developers who made the changes, to test the software product to ensure proper functionality of all flows associated with the changes. As more and more of these test cases are created to address discrete changes to the software product, the number of test cases created for the software product may grow in size substantially, resulting in a massive number of test cases needing to be run each time the software product is tested. However, by cataloging all of these test cases that are created over time, it may be possible to determine which test cases apply and correspond to different portions of the software product.

In an embodiment, the set of test cases are executed to test the software product (Operation 304). In this approach, all of the test cases may be executed in series and/or in parallel, when appropriate, to ensure that each test case has completed successfully or unsuccessfully.

A successful completion for a test case indicates that the flow of the software product that is tested by the particular test case functioned properly and as expected under the testing conditions of the test case. An unsuccessful completion for a test case indicates that a corresponding flow of the software product that is tested by the particular test case did not function properly and/or functioned unexpectedly under the testing conditions of the test case.

In an approach, results and associated data from each of the test cases may be preserved from previous tests performed on the software product, and these aggregated test results may be relied upon rather than executing all of the test cases at once, as in Operation 304.

Results from executing test cases may include, but is not limited to, indication of successful or unsuccessful execution and a timestamp indicating when the test case was executed.

The associated data from execution of a test case may include, but is not limited to, one or more issues detected during execution of the test case, indication of a type of issue that was observed from the test case, one or more flows of the software product that are tested by the test case, etc.

In an embodiment, a computing device determines whether any new test cases have been created and/or added to the set of test cases since the software product was most recently tested (Operation 306). In response to new test cases being detected, method 300 continues to Operation 308; otherwise, method 300 continues to Operation 310.

In one approach, this determination may be based on a flag or some other indicator that may be included in the test cases and/or results from previous execution of the test cases. In an example, each test case that has already been executed and results obtained may have its associated flag flipped to indicate execution, while new test cases that have not been executed may have their associated flags set to indicate that they have not been executed and/or were executed more than a particular amount of time in the past and should be executed again.

In an embodiment, in response to new test cases being detected, the new test cases are executed on the software product to determine results and associated data from each of the new test cases (Operation 308). Moreover, the new test cases are added to the set of test cases, for future use and reference.

In an approach, the set of test cases may be stored to a data repository. In a further approach, results and/or associated data from execution of the set of test cases may be stored to the data repository.

In an embodiment, whether new test cases were added or not, a test case-to-programmatic flow mapping is generated based on execution of the set of test cases (Operation 310). In an approach, the test case-to-programmatic flow mapping may be generated by associating each test case from the set of test cases with one or more programmatic flows that are tested by the particular test case, with the association being based on analysis of which portions of the software product are accessed by the particular test case.

In an example, the test case-to-programmatic flow mapping may be a table, like Table 1 below, which lists each test case by a known identifier (e.g., test case name), along with indication of one or more programmatic flows (e.g., UI flow entry page) which are accessed and/or tested by the test case. In this example, each test case corresponds to a single UI flow, but such a one-to-one relationship is not required.

TABLE 1

| Test Case Name | UI Flow |
| --- | --- |
| Test-crm-create-opty | /crm/opty |
| Test-hr-update-person | /hr/person |
| Test-hr-promote-goals | /hr/goals |
| ... | ... |

In an example, when the software product comprises a UI, each programmatic flow may be a UI flow, and the test case-to-programmatic flow mapping will indicate a relationship, for each test case, with one or more UI flows that are accessed and/or tested by the particular test case. Moreover, an entry page for each test case may be recorded in the test case-to-programmatic flow mapping to indicate the associated UI flow(s) for the executed test cases.

In one approach, if test cases are developed to indicate which programmatic flows are tested by the particular test cases, then execution of the test cases may be deferred, reduced, or eliminated, and the test case-to-programmatic flow mapping may be based on the reported programmatic flow(s) that each test case is designed to test.

In an approach, the test case-to-programmatic flow mapping may be stored to a data repository, e.g., as a table, spreadsheet, database, etc. In a further approach, results and/or associated data from execution of the set of test cases may be stored to the data repository in association with the test case-to-programmatic flow mapping.

Figure 3B:
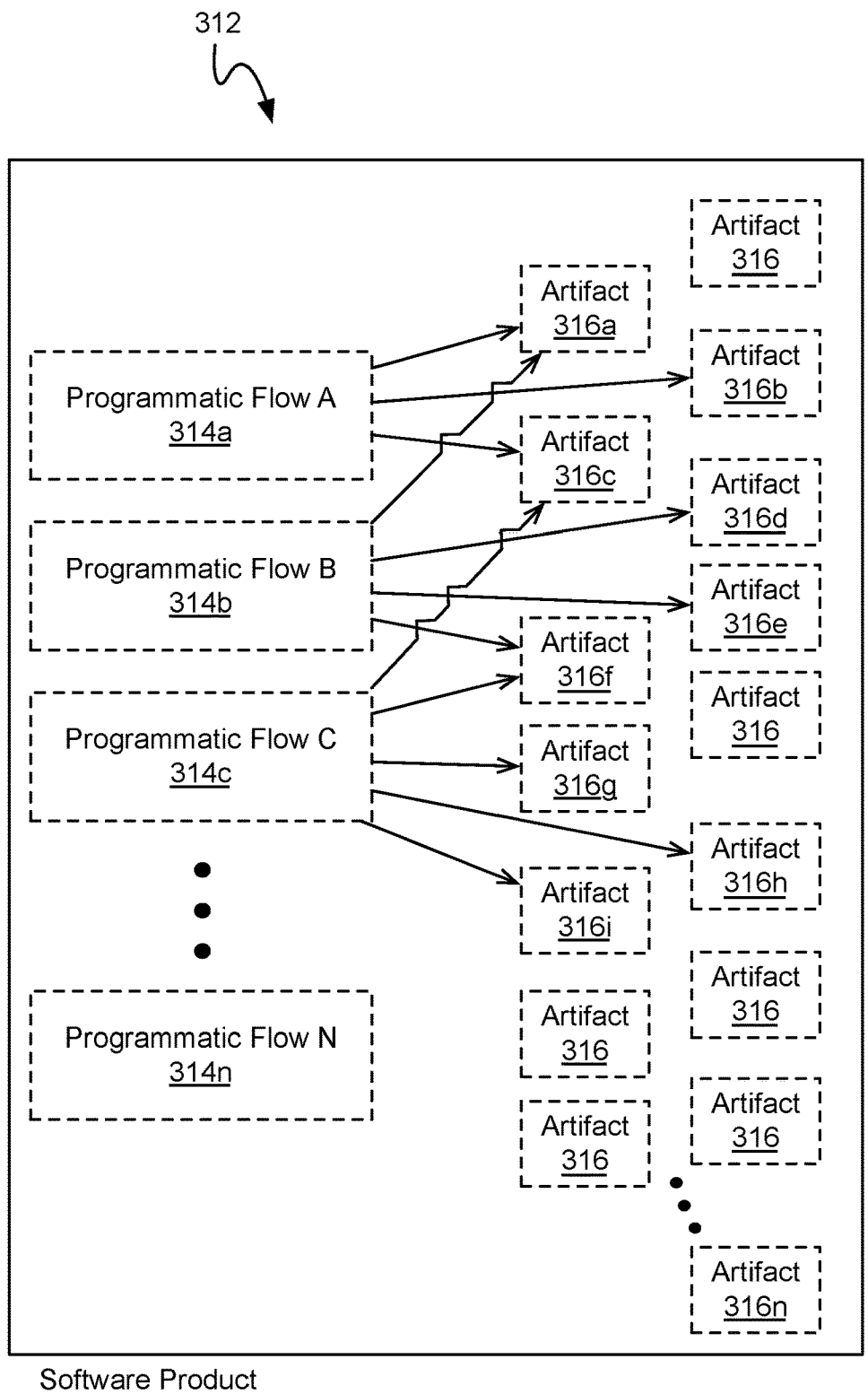
FIG. 3B illustrates logical software dependencies in a software product according to one or more embodiments.

FIG. 3B illustrates logical software dependencies in a software product 312 according to one or more embodiments. The software product 312 includes a plurality of programmatic flows (e.g., 314a, 314b, 314c, . . . , 314n) and a plurality of artifacts 316 (e.g., 316a, 316b, 316n). Each of the programmatic flows represents a portion of the software product 312 that has one or more specific purposes, performs one or more certain functions, and/or is assigned one or more particular tasks. Examples of programmatic flows include, but are not limited to, user interface (UI) flows, User Experience (UX) flows, programming code modules, discrete code segments, user interface screens, etc.

UI flows illustrate how a user navigates through a software product via different UI pages or screens. UI flows may indicate how different pages of one or more UIs of the software product 312 are connected, and how a user is able to step through the various pages of the software product 312. In one or more embodiments, UI flows may comprise screens and navigation paths between the various screens. UI flows are different from process or system flows because they do not describe how a user or system completes a task, activity, or function, but rather describe one or more available paths for a user to physically navigate the various interfaces of the software product 312.

FIG. 3B illustrates various relationships and dependencies between the various programmatic flows and artifacts resident in the software product 200. In this example, programmatic flow A 314a relates to, utilizes, changes, creates, or otherwise is connected to artifact 316b independent of any other programmatic flow, and it shares a connection to artifact 316a with programmatic flow B 314b. Programmatic flow A 314a also shares a connection to artifact 316c with programmatic flow C 314c. Further, programmatic flow B 314b is connected to artifacts 316d, 316e independent of any other programmatic flow, and shares connections to artifact 316f with programmatic flow C 314c. Programmatic flow C 314c is connected to artifacts 316g, 316h, 316i independent of any other programmatic flow. The remaining artifacts 316 are not connected to any programmatic flows.

The relationships and dependencies between the programmatic flows and artifacts is useful for determining which of the artifacts will be effected by changes or updates to certain portions of the software product. For example, if programmatic flow C 314c is changed, then artifacts 316f, 316g, 316h, and 316i may be effected by the changes. Conversely, if unexpected behavior is identified in a particular artifact it can be traced back to one or more specific programmatic flows that utilize the particular artifact. For example, if unexpected behavior (e.g., hanging, crashing, looping, etc.) is identified in artifact 316e, then programmatic flow B 314b would be examined to determine why this behavior is happening, since this is the only programmatic flow that is connected to artifact 316e.

Figure 4:
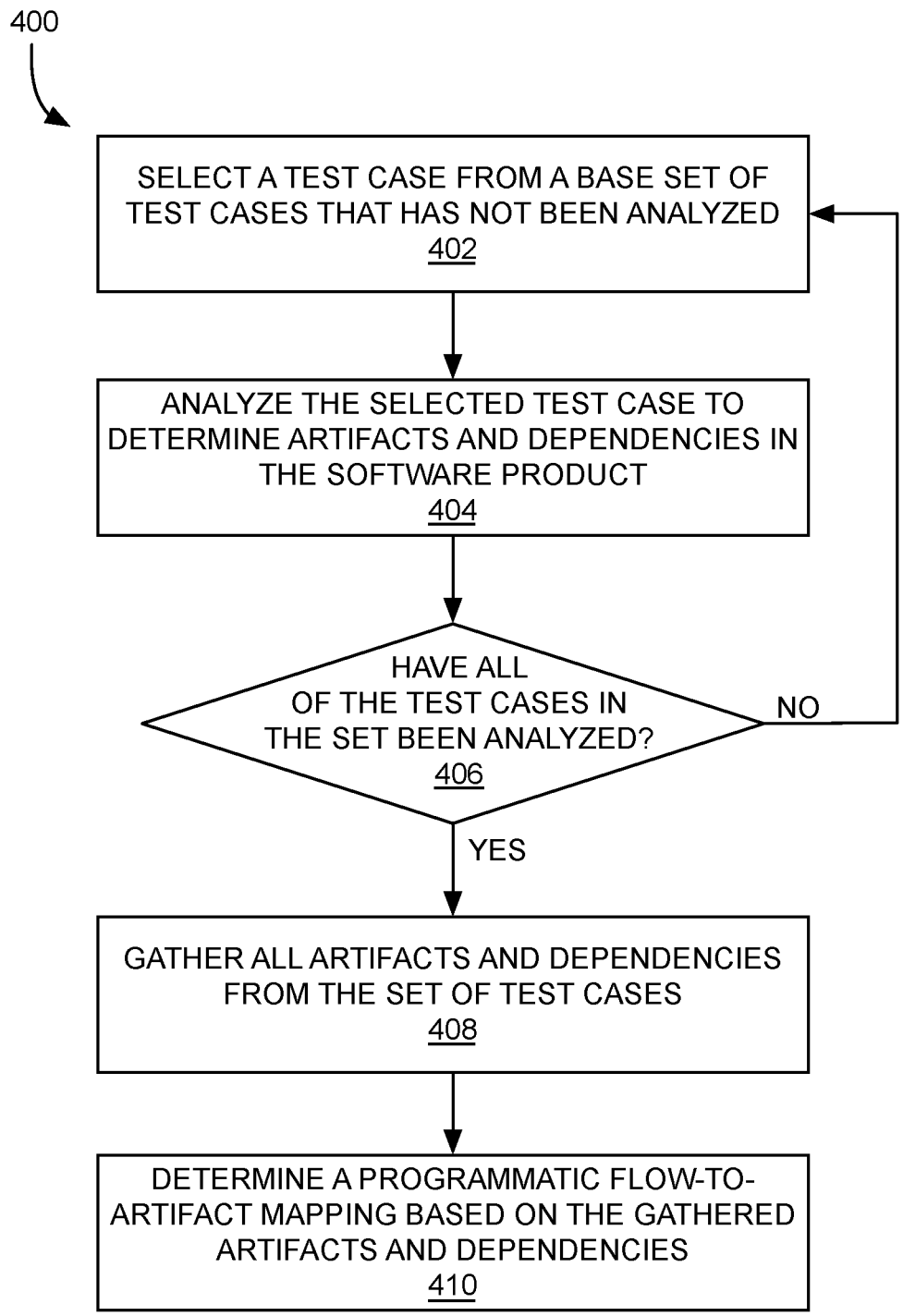
FIG. 4 illustrates an example method for generating metadata that maps programmatic flows to artifacts in accordance with one or more embodiments; for FIG. 5 illustrates an example method for determining a reduced test case set in accordance with one or more embodiments.

FIG. 4 illustrates an example method 400 for generating metadata that maps programmatic flows to artifacts in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, a test case from the set of test cases, that has not already been analyzed in method 400, is selected for analysis (Operation 402). Any selection procedure may be used, such as using an ordered list, by test case size, by test case creation or last execution date, etc.

In an embodiment, the selected test case is analyzed to determine artifacts and/or dependencies within one or more related programmatic flows of the software product (Operation 404). A dependency may be any connection, reference, pointer, call, or other link between an object or routine within a portion of code under analysis, and another portion of code within the software product.

This analysis may use any methodology for determining artifacts and dependencies. In one or more embodiments, the computing system may scan the software product's code at each portion or segment which is associated with each particular programmatic flow related to the test case. The various programmatic flows related to the test case may be determined from a test case-to-programmatic flow mapping, e.g., a test case-to-programmatic flow mapping generated by method 300 in FIG. 3A.

Referring again to FIG. 4, the scanning may search for and determine all artifacts that are within the code, and all artifacts or other programmatic flows that are referenced by artifacts within the particular programmatic flow related to the test case.

In one approach, each of the determined artifacts and dependencies may be stored to the data repository for future use and/or reference.

In an embodiment, the computing device determines whether all test cases in the set of test cases have been analyzed (Operation 406). In response to more test cases not being analyzed yet, method 400 returns to Operation 402. When all test cases have been analyzed, method 400 continues to Operation 408.

In an embodiment, all artifacts and dependencies that have been determined through analysis of the set of test cases are gathered together along with which test cases they relate to (Operation 408). This gathered data may be subjected to further analysis. In one approach, all gathered artifacts and dependencies may be stored to a common data repository for searching, filtering, and/or de-duplication. Because the various programmatic flow that relate to each test case are known from the test case-to-programmatic flow mapping, the various artifacts that are created, used, stored, modified, and/or related to a particular programmatic flow may be associated back to a test case which tests that particular programmatic flow.

In an embodiment, a programmatic flow-to-artifact mapping is determined from the gathered artifacts and dependencies of the set of test cases (Operation 410). The programmatic flow-to-artifact mapping indicates which artifacts are related to each of the various programmatic flows in the software product.

In an example, the programmatic flow-to-artifact mapping may be a table, like Table 2 below, which lists an indication of each programmatic flow (e.g., UI flow entry page), along with indication (e.g., a full, relational, or partial path name) of one or more artifacts that are accessible through and/or dependent on that particular UI flow. In this example, each UI flow corresponds to multiple artifacts and no artifacts are shared by multiple UI flows, but such relationships are not required and a UI flow could relate to a single artifact, and any one artifact may relate to multiple UI flows.

TABLE 2

| UI Flow | Artifact(s) |
|---|---|
| /crm/opty | /apps/crm/opty/ui/opty.jspx |
| | /apps/crm/opty/ui/optyDetail.jsff |
| | /apps/crm/opty/ui/model/opty.java |
| | /apps/crm/opty/ui/model/backend/opty.xml |
| /hr/person | /apps/hcm/hr/ui/person.jspx |
| | /apps/hcm/hr/ui/model/hrOperation.java |
| /hr/goals | /apps/hcm/hr/ui/goals.jspx |
| | /apps/hcm/hr/ui/model/goal.java |
| | /apps/hcm/hr/ui/model/goalsetting.java |
| | /apps/hcm/hr/ui/model/goalsetting.plsql |
| . . . | . . . |

In an approach, inputs from the test case-to-programmatic flow mapping may be used to determine all programmatic flows that are tested within the software product. Then, a segment or portion of code related to a particular programmatic flow may be scanned to determine every artifact that is dependent or associated with the segment or portion of code, e.g., related to the programmatic flow.

Various different programming languages and/or code bases may dictate that different methods of determining dependencies are used. However, regardless of the technology used to create the software product, it is always possible to build a programmatic flow-to-artifact mapping that links one artifact to all other related artifacts by analyzing the code.

In an approach, the programmatic flow-to-artifact mapping may be stored to a data repository, e.g., as a table, spreadsheet, database, etc.

4. Determining a Reduced Set of Test Cases

Figure 5:
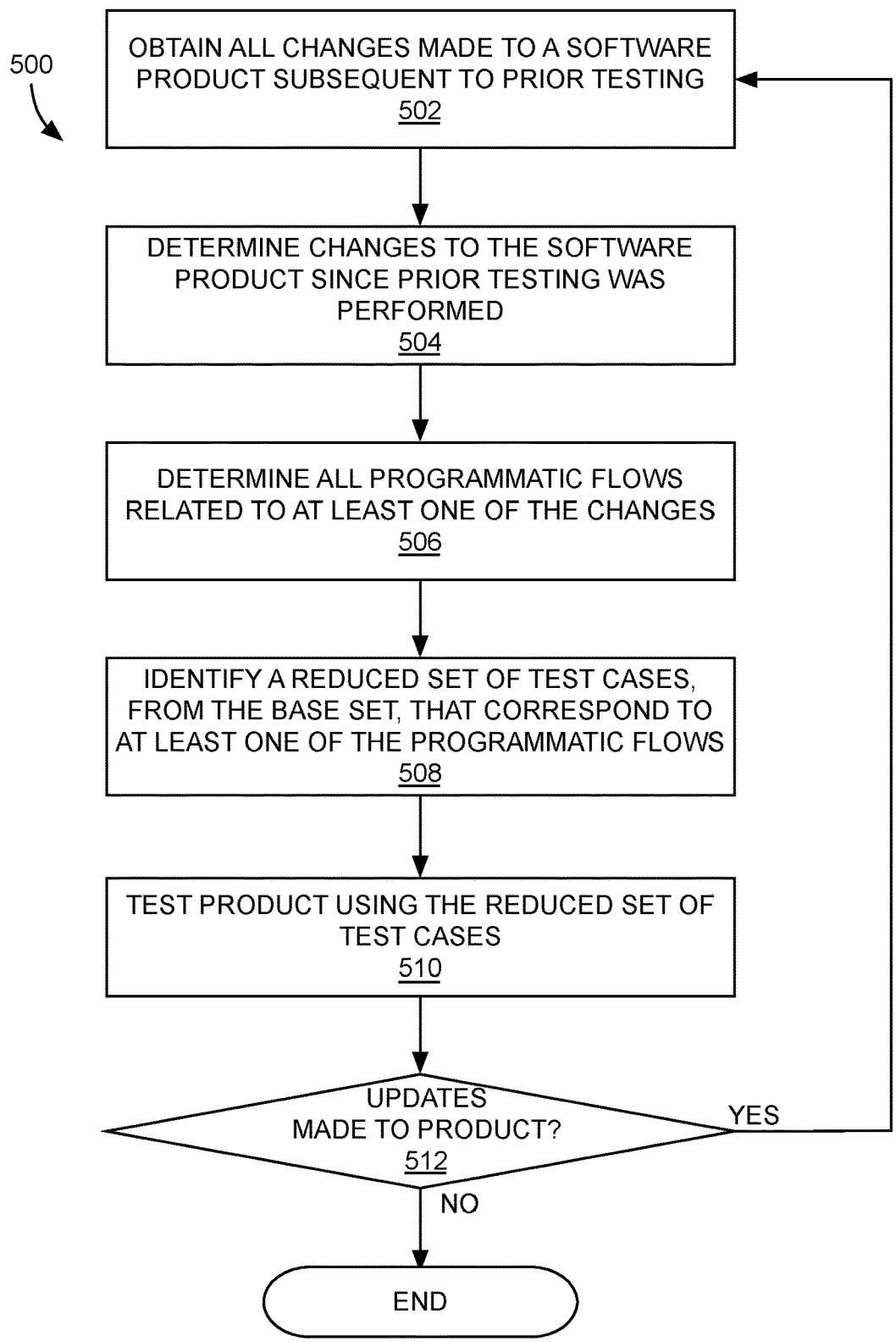

FIG. 5 illustrates an example method 500 for determining a reduced test case set in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, the system identifies all changes that have been made to the software product subsequent to prior testing of the software product (Operation 502). The changes may result from actions by developers, coders, architects, software engineers, etc. In one example, changes which have been made since the software product was previously tested are obtained, in order to determine whether these changes have led to unexpected behavior in the software product.

In an approach, each time a change is made to the software product, it may be recorded in a table or some other data store configured to record version and revision history of the software product. In order to determine all the changes made to software product since prior testing was performed, all changes recorded in the table after the date/time of the prior testing may be retrieved.

In one or more approaches, a list of all code pushes requested and performed by one or more developers since prior testing was performed may be received, in order to obtain the changes made to the software product. For each code push label, all files, objects, etc., that were changed are retrieved and all the transactions are denoted.

In an embodiment, the system identifies changes to the software product since prior testing of the software product (Operation 504). The changes may be represented or referenced as particular artifacts, files, code segments, collections of line numbers, or some other way of indicating different objects within the software product. The changes to the software product may be identified by comparing a prior version of the software product previously tested with a current version of the software product to determine the changes between the two versions. The changes to the software product may be identified by logging or other tracking techniques that indicate all changes made to the software product.

In an embodiment, all programmatic flows related to at least one of the changes of the software product are determined (Operation 506). In an approach, this determination may be based on the programmatic flow-to-artifact mapping. Once the changed files/artifacts in the software product are known, the names of the files/artifacts may be looked up in the programmatic flow-to-artifact mapping to determine which programmatic flows utilize and/or depend on that file/artifact. In one example, a single artifact may be mapped to multiple programmatic flows because each of the programmatic flows access the artifact.

In an embodiment, the system identifies a reduced set of test cases, from the base set of test cases, that correspond to at least one of the programmatic flows (Operation 508) that were identified in Operation 506. In an approach, the test case-to-programmatic flow mapping may be used to determine which test case corresponds to the programmatic flows related to the changes made to the software product. The reduced set of test cases will include fewer tests than the base set of test cases. The reduced set of test cases includes a subset of the base set of test cases, which are directed to changes made to the software product since a prior test. Tests, which do not correspond to any programmatic flows corresponding to modified artifacts, may be excluded from the reduced set of test cases.

The system tests the software product using the reduced set of test cases (Operation 510). Further, one or more test cases not included in the reduced set are not executed, even if these test cases are part of the base set of test cases.

After testing the software product using the reduced set of test cases, the system determines whether any updates or changes have been made to the software product (Operation 512). In response to changes being detected, method 500 returns to Operation 502 to obtain the changes. If no updates are made to the software product, method 500 ends.

Testing the software product using method 500 provides a reduced set of test cases that are sufficient to fully test new capabilities of the software product without running test cases that have already completed successfully and address unchanged portions of the software product. In an example, for a relatively low number of changes to the software product, the reduced test case set may be much smaller than the base set of test cases. The reduced set of test cases may execute in a few minutes. In contrast, the base set of test cases may take days to complete.

Moreover, due to the reduced testing cycle timeframe, when unexpected behavior is observed due to the testing, it can more efficiently be traced back to its source, corrected, and narrowly re-tested (with another reduced set of test cases directed to new changes) to determine if the new changes fixed the observed behavior or if additional efforts are needed to correct the problem(s).

5. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

In one example, assume that a human resources (HR) interface is under test. The HR interface includes three programmatic flows: a first programmatic flow for updating employee salary, a second programmatic flow for updating employee address, and a third programmatic flow for modifying a vacation policy for employees. Initially, in a base test case set, there are three test cases which: (a) test the software by updating salary by 10%, (b) test the software by updating an address for employee Joe Smith, and (c) test the software by adding a vacation day to the current vacation policy. After these test cases are executed and results obtained from the test cases, a new field phone number is added to an employee's record (artifact). This employee's record is mapped to two programmatic flows: the first programmatic flow that updates employee salary and the second programmatic flow that updates employee address, but not to the third programmatic flow that modifies the vacation policy.

In this example, two programmatic flows (e.g., the first and second programmatic flows) are mapped to test cases (a) and (b), but not to test case (c). In a reduced test case set, test cases (a) and (b) may be executed without executing test case (c) to address the change to the employee's record.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts" or "clients") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
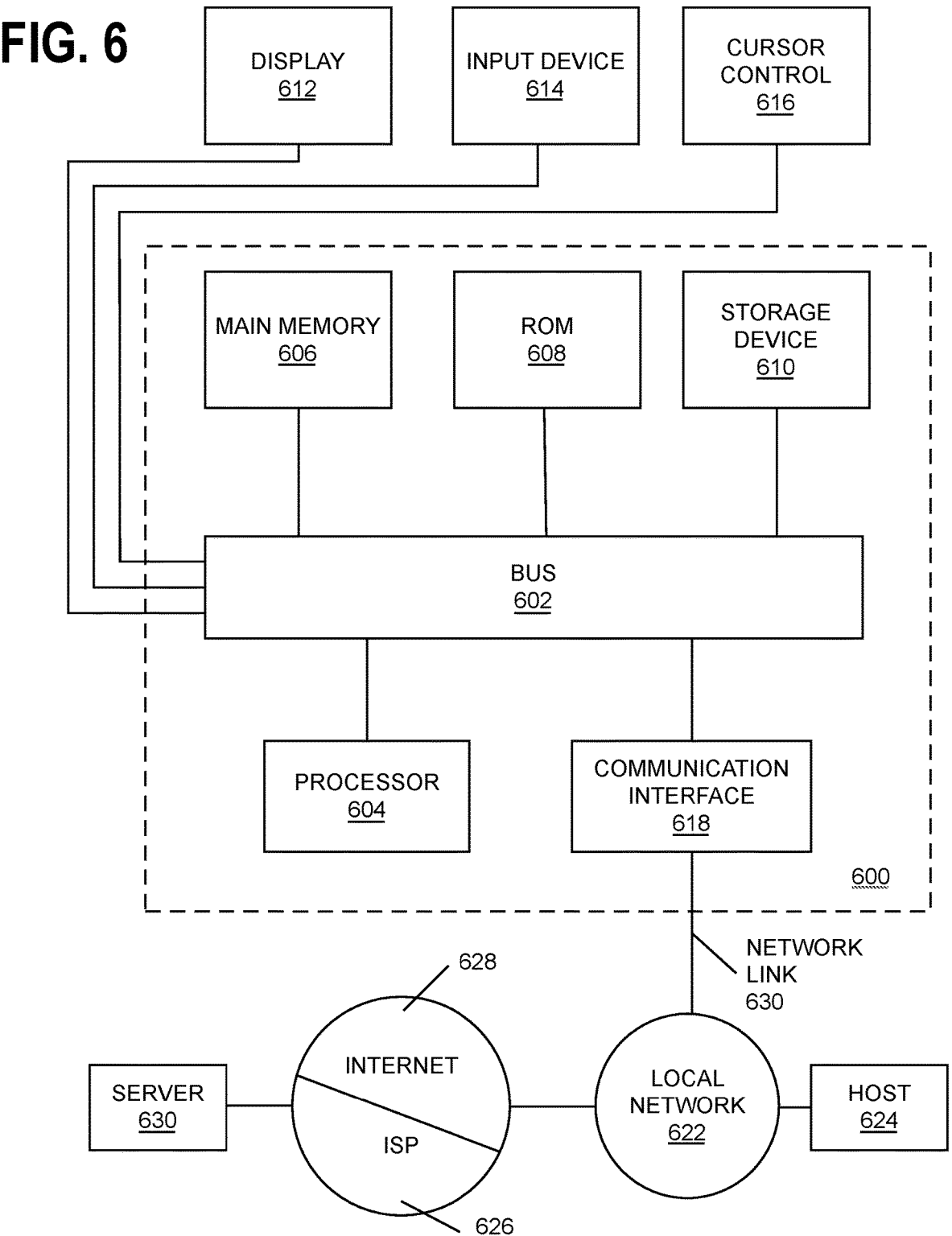
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    determining a plurality of programmatic flows from a software product, each programmatic flow being accessed by at least one of a plurality of test cases for testing the software product;
    subsequent to initial testing of the software product using the plurality of test cases: determining that a particular code artifact, of a plurality of code artifacts of the software product, is affected by one or more changes to the software product;
    mapping the particular code artifact to at least a first programmatic flow and a second programmatic flow of the plurality of programmatic flows, wherein mapping the particular code artifact to the first programmatic flow comprises operations for:
        determining a first subset of code artifacts from the plurality of code artifacts that are: (a) accessed by the first programmatic flow, or (b) dependent on the first programmatic flow; and
        storing a relationship between (a) the first programmatic flow, and (b) the first subset of code artifacts, wherein the first subset of code artifacts comprises the particular code artifact;
    responsive to mapping the particular code artifact to at least the first programmatic flow and the second programmatic flow: selecting the first programmatic flow and the second programmatic flow for testing;
    mapping the first programmatic flow and the second programmatic flow to a first subset of test cases from the plurality of test cases; and
    testing the software product by executing the first subset of test cases without executing a second subset of test cases that are: (a) not mapped to the first programmatic flow, and (b) not mapped to the second programmatic flow.

2. The medium as recited in claim 1, wherein determining the plurality of programmatic flows comprises operations for:
    executing a first test case on the software product;
    determining that executing the first test case results in accessing a first entry page of a user interface of the software product, the first entry page corresponding to the first programmatic flow;
    storing a relationship between (a) the first programmatic flow, and (b) the first test case,
    wherein mapping the first programmatic flow to the first subset of test cases is based on the stored relationship, and
    wherein the first subset of test cases comprises the first test case.

3. The medium as recited in claim 2, wherein determining the plurality of programmatic flows further comprises operations for:
    executing a second test case on the software product;
    determining that executing the second test case results in accessing a second entry page of the user interface, the second entry page corresponding to the second programmatic flow;
    storing a relationship between (a) the second programmatic flow, and (b) the second test case,
    wherein mapping the second programmatic flow to the first subset of test cases is based on the stored relationship, and
    wherein the first subset of test cases comprises the second test case.

4. The medium as recited in claim 1, wherein the plurality of code artifacts are selected from a group of artifacts comprising: visual representation files, references, calls, requests, executables, code segments, objects, automated behavior sequences, control sequences, user interface actions, and grammar rules.

5. The medium as recited in claim 1, wherein mapping the particular code artifact to the second programmatic flow comprises operations for:
    determining a second subset of code artifacts from the plurality of code artifacts that are: (a) accessed by the second programmatic flow, or (b) dependent on the second programmatic flow; and
    storing a relationship between (a) the second programmatic flow, and (b) the second subset of code artifacts, wherein the second subset of code artifacts comprises the particular code artifact.

6. The medium as recited in claim 1, wherein the operations further comprise:
    generating a reduced subset of test cases comprising one or more new test cases, the one or more new test cases being based on changes made to the software product subsequent to testing the software product by executing the first subset of test cases; and
    re-testing the software product by executing the reduced subset of test cases without executing the first subset of test cases.

7. The medium as recited in claim 1, wherein the first programmatic flow and the second programmatic flow are selected for testing without selecting a third programmatic flow that is not mapped to the particular code artifact.

8. A system, comprising:
    one or more hardware processors;
    a non-transitory computer readable medium comprising instructions which, when executed by the one or more hardware processors, causes performance of operations comprising:
        determining a plurality of programmatic flows from a software product, each programmatic flow being accessed by at least one of a plurality of test cases for testing the software product;

subsequent to initial testing of the software product using the plurality of test cases: determining that a particular code artifact, of a plurality of code artifacts of the software product, is affected by one or more changes to the software product;

mapping the particular code artifact to at least a first programmatic flow and a second programmatic flow of the plurality of programmatic flows, wherein mapping the particular code artifact to the first programmatic flow comprises operations for:

determining a first subset of code artifacts from the plurality of code artifacts that are: (a) accessed by the first programmatic flow, or (b) dependent on the first programmatic flow; and storing a relationship between (a) the first programmatic flow, and (b) the first subset of code artifacts, wherein the first subset of code artifacts comprises the particular code artifact;

responsive to mapping the particular code artifact to at least the first programmatic flow and the second programmatic flow: selecting the first programmatic flow and the second programmatic flow for testing;

mapping the first programmatic flow and the second programmatic flow to a first subset of test cases from the plurality of test cases; and testing the software product by executing the first subset of test cases without executing a second subset of test cases that are: (a) not mapped to the first programmatic flow, and (b) not mapped to the second programmatic flow.

9. The system as recited in claim 8, wherein determining the plurality of programmatic flows comprises operations for:

executing a first test case on the software product;

determining that executing the first test case results in accessing a first entry page of a user interface of the software product, the first entry page corresponding to the first programmatic flow;

storing a relationship between (a) the first programmatic flow, and (b) the first test case, wherein mapping the first programmatic flow to the first subset of test cases is based on the stored relationship, and wherein the first subset of test cases comprises the first test case.

10. The system as recited in claim 9, wherein determining the plurality of programmatic flows further comprises operations for:

executing a second test case on the software product;

determining that executing the second test case results in accessing a second entry page of the user interface, the second entry page corresponding to the second programmatic flow;

storing a relationship between (a) the second programmatic flow, and (b) the second test case, wherein mapping the second programmatic flow to the first subset of test cases is based on the stored relationship, and wherein the first subset of test cases comprises the second test case.

11. The system as recited in claim 8, wherein the plurality of code artifacts are selected from a group of artifacts comprising: visual representation files, references, calls, requests, executables, code segments, objects, automated behavior sequences, control sequences, user interface actions, and grammar rules.

12. The system as recited in claim 8, wherein mapping the particular code artifact to the second programmatic flow comprises operations for:

determining a second subset of code artifacts from the plurality of code artifacts that are: (a) accessed by the second programmatic flow, or (b) dependent on the second programmatic flow; and storing a relationship between (a) the second programmatic flow, and (b) the second subset of code artifacts, wherein the second subset of code artifacts comprises the particular code artifact.

13. The system as recited in claim 8, wherein the operations further comprise:

generating a reduced subset of test cases comprising one or more new test cases, the one or more new test cases being based on changes made to the software product subsequent to testing the software product by executing the first subset of test cases; and re-testing the software product by executing the reduced subset of test cases without executing the first subset of test cases.

14. The system as recited in claim 8, wherein the first programmatic flow and the second programmatic flow are selected for testing without selecting a third programmatic flow that is not mapped to the particular code artifact.

15. A method, comprising:

determining a plurality of programmatic flows from a software product, each programmatic flow being accessed by at least one of a plurality of test cases for testing the software product;

subsequent to initial testing of the software product using the plurality of test cases: determining that a particular code artifact, of a plurality of code artifacts of the software product, is affected by one or more changes to the software product;

mapping the particular code artifact to at least a first programmatic flow and a second programmatic flow of the plurality of programmatic flows, wherein mapping the particular code artifact to the first programmatic flow comprises operations for:

determining a first subset of code artifacts from the plurality of code artifacts that are: (a) accessed by the first programmatic flow, or (b) dependent on the first programmatic flow; and storing a relationship between (a) the first programmatic flow, and (b) the first subset of code artifacts, wherein the first subset of code artifacts comprises the particular code artifact;

responsive to mapping the particular code artifact to at least the first programmatic flow and the second programmatic flow: selecting the first programmatic flow and the second programmatic flow for testing;

mapping the first programmatic flow and the second programmatic flow to a first subset of test cases from the plurality of test cases; and testing the software product by executing the first subset of test cases without executing a second subset of test cases that are: (a) not mapped to the first programmatic flow, and (b) not mapped to the second programmatic flow, wherein the first programmatic flow and the second programmatic flow are selected for testing without selecting a third programmatic flow that is not mapped to the particular code artifact, and wherein the method is performed by at least one device including a hardware processor.

16. The method as recited in claim 15, wherein determining the plurality of programmatic flows comprises:
- executing a first test case on the software product;
- determining that executing the first test case results in accessing a first entry page of a user interface of the software product, the first entry page corresponding to the first programmatic flow;
- storing a relationship between (a) the first programmatic flow, and (b) the first test case,
- wherein mapping the first programmatic flow to the first subset of test cases is based on the stored relationship, and
- wherein the first subset of test cases comprises the first test case.

17. The method as recited in claim 16, wherein determining the plurality of programmatic flows further comprises:
- executing a second test case on the software product;
- determining that executing the second test case results in accessing a second entry page of the user interface, the second entry page corresponding to the second programmatic flow;
- storing a relationship between (a) the second programmatic flow, and (b) the second test case,
- wherein mapping the second programmatic flow to the first subset of test cases is based on the stored relationship, and
- wherein the first subset of test cases comprises the second test case.

18. The method as recited in claim 15, wherein the plurality of code artifacts are selected from a group of artifacts comprising: visual representation files, references, calls, requests, executables, code segments, objects, automated behavior sequences, control sequences, user interface actions, and grammar rules.

19. The method as recited in claim 15, wherein mapping the particular code artifact to the second programmatic flow comprises:
- determining a second subset of code artifacts from the plurality of code artifacts that are: (a) accessed by the second programmatic flow, or (b) dependent on the second programmatic flow; and
- storing a relationship between (a) the second programmatic flow, and (b) the second subset of code artifacts,
- wherein the second subset of code artifacts comprises the particular code artifact.

20. The method as recited in claim 15, further comprising:
- generating a reduced subset of test cases comprising one or more new test cases, the one or more new test cases being based on changes made to the software product subsequent to testing the software product by executing the first subset of test cases; and
- re-testing the software product by executing the reduced subset of test cases without executing the first subset of test cases.

* * * * *